(12) United States Patent
Parker

(10) Patent No.: US 6,652,801 B2
(45) Date of Patent: Nov. 25, 2003

(54) METHOD FOR PRODUCING AGGLOMERATED BORON CARBIDE

(76) Inventor: Gerard E. Parker, 1201 Colony Ct., Apartment 1, Zanesville, OH (US) 43701

( * ) Notice: Subject to any disclaimer, the term of this patent is extended or adjusted under 35 U.S.C. 154(b) by 147 days.

(21) Appl. No.: 09/795,157

(22) Filed: Feb. 28, 2001

(65) Prior Publication Data
US 2003/0173693 A1 Sep. 18, 2003

Related U.S. Application Data
(60) Provisional application No. 60/186,984, filed on Mar. 6, 2000.

(51) Int. Cl.$^7$ ................................................. C04B 33/32
(52) U.S. Cl. ...................... 264/605; 264/656; 264/657; 264/669; 264/670
(58) Field of Search ................................ 264/628, 656, 264/657, 669, 670, 605

(56) References Cited

U.S. PATENT DOCUMENTS

| | | | | |
|---|---|---|---|---|
| 4,684,480 A | | 8/1987 | Lipp et al. | 252/478 |
| 4,718,941 A | | 1/1988 | Halverson et al. | 75/236 |
| 4,804,525 A | | 2/1989 | Rafaniello et al. | 423/291 |
| 4,853,350 A | * | 8/1989 | Chen et al. | 501/9 |
| 5,486,223 A | | 1/1996 | Carden | 75/244 |
| 5,613,189 A | | 3/1997 | Carden | 428/565 |
| 5,669,059 A | | 9/1997 | Carden | 419/12 |
| 5,700,962 A | | 12/1997 | Carden | 75/236 |
| 5,712,014 A | | 1/1998 | Carden | 428/65.6 |
| 5,720,911 A | * | 2/1998 | Taylor et al. | 264/29.1 |
| 5,722,033 A | | 2/1998 | Carden | 419/12 |
| 5,803,151 A | | 9/1998 | Carden | 164/5 |
| 5,865,238 A | | 2/1999 | Carden et al. | 164/97 |
| 5,895,696 A | | 4/1999 | Stanish et al. | 428/64.1 |
| 5,921,312 A | | 7/1999 | Carden | 164/369 |
| 5,948,495 A | | 9/1999 | Stanish et al. | 428/64.1 |
| 5,980,602 A | | 11/1999 | Carden | 75/236 |
| 6,010,648 A | * | 1/2000 | Yamamoto et al. | 264/15 |

* cited by examiner

Primary Examiner—Christopher A. Fiorilla
(74) Attorney, Agent, or Firm—C. John Brannon; Bingham McHale LLP

(57) ABSTRACT

A method for producing agglomerated boron carbide, including the steps of providing a boron carbide powder precursor having particle sizes smaller than about 1 micron in diameter, mixing the boron carbide powder precursor with binder solution to form a slurry, drying the slurry to yield a solid residue, crushing the solid residue to yield green boron carbide particles, and firing the green boron carbide particles. The resultant agglomerated boron carbide particles have diameters generally ranging from about 5 to about 20 microns. The agglomerated boron carbide particles are characterized as boron carbide grains of about 1–2 microns in diameter suspended in a vitreous boron oxide matrix.

19 Claims, 5 Drawing Sheets

METHOD FOR PRODUCING AGGLOMERATED BORON CARBIDE

REFERENCE TO RELATED APPLICATION

The present application is a utility application based upon Provisional application Ser. No. 60/186,984; filed Mar. 6, 2000.

TECHNICAL FIELD OF THE INVENTION

The present invention relates generally to a method for agglomerating ceramic materials and, more particularly, to a method for agglomerating boron carbide powders.

BACKGROUND OF THE INVENTION

Boron carbide ($B_4C$) Is a useful ceramic compound. $B_4C$ is third hardest material known, following diamond and cubic boron nitride (cBN). $B_4C$ is hard, lightweight, and wear resistant, making it attractive for such applications as sandblasting nozzles, bearings, dies, lapping and polishing abrasive powders, sporting equipment (as part of a metal matrix composite in high-performance bicycles, golf clubs, tennis rackets), and armor (such as armor tiles and bullet-proofing materials). $B_4C$ is also useful as an anti-oxidant additive to refractory materials, such as in magnesia-carbon bricks. $B_4C$ is also useful as a raw material for the production of other boron-containing materials such as titanium boride and boriding agents. $B_4C$ may be used as a solid fuel propellant for ducted rockets. Boron carbide containing welding rods are used to improve the wear resistance of welded surfaces. Boron carbide is also a good neutron absorber, having an exceptionally high cross-section for thermal neutrons.

Accordingly, $B_4C$ is attractive as a lightweight radiation shielding material. Boron carbide is used both in powder and solid form to control the rate of fission in nuclear reactors. $B_4C$ is readily oxidized, and is therefore usually mixed with other structurally attractive materials, such as aluminum metal or polyethylene plastic, to protect it from oxidation in reactor environments. $B_4C$ metal-matrix composite (MMC) plates have wide applications as isolators in spent fuel element racks, inner sections of reactor shields, shutdown control rods, neutron curtains, shutters for thermal columns, and shipping containers. $B_4C$ metal-matrix composites can withstand temperatures up to about 540° C.

$B_4C$ may be produced by a number of known methods. One method for producing boron carbide is disclosed in U.S. Pat. No. 2,834,651. The '651 patent discloses a method of producing fine boron carbide of fine particle size by heating a mixture of boron oxide, carbon and magnesium. While efficient, this process is unsuitable for producing highly pure boron carbide or boron carbide free of magnesium-containing impurities.

Very fine powders of boron carbide have been produced by vapor phase reactions of boron compounds with carbon or hydrocarbons, using laser or plasma energy sources. These reactions tend to form highly reactive amorphous powders. Due to their extreme reactivity, handling in inert atmospheres may be required to avoid excessive oxygen and nitrogen contamination. These very fine powders have extremely low bulk densities which make loading hot press dies and processing greenware very difficult.

Another method known in the art for producing boron carbide powder is described in U.S. Pat. No. 3,379,647. That method involves a carbothermic reduction of boron oxide. According to the '647 patent, a reactive mixture comprising a carbon source, such as finely divided carbon, and a boron oxide source, such as a boron oxide, is prepared and then fired at a relatively high temperature, whereby the boron oxide which is present initially or which is formed thereupon is reduced, the corresponding boron carbide being concurrently produced. This reaction ordinarily proceeds according to the general equation:

Generally, the temperature of firing the reactive mixture above is in the range of 1700° C.–2100° C. The reaction is generally carried out in a protective, non-interfering atmosphere such as an inert gas or a vacuum. Boron carbide is not a congruently melting/fusing material, and so as $B_4C$ precipitates from the melt, the remaining melt becomes increasingly rich in carbon. Accordingly, attention must be given to the rate at which $B_4C$ is precipitated from the melt, such that the liquid and solid precipitate do not reach an equilibrium. The final composition of the resulting solid material is ideally a $B_4C$ phase and a graphite phase. One shortcoming of this method is that substantially all of the $B_4C$ produced is not below one micron in size, and a uniform particle size distribution (PSD) is not obtained. Accordingly, the particle size of boron carbide can range anywhere from 0.5 to 150 microns with little control of PSD.

Another known method of producing boron carbide is described in U.S. Pat. No. 4,804,525. The '525 patent discloses a method of producing boron carbide powder of submicron size by passing a particulate reactive mixture of a boric oxide source and a carbon source through a hot zone such that substantially all of the particles are separately and individually heated at a sufficient temperature and for a sufficient length of time to form boron carbide crystals of submicron size.

While many techniques are known for producing boron carbide, most yield $B_4C$ in the form of a powder having a PSD peaking at about 3–5 microns or finer. Moreover, many of the techniques producing larger $B_4C$ particles do so with little PSD control and/or little purity control. For many applications, it is desirable to be able to reliably produce larger $B_4C$ particles. For example, $B_4C$ is a good neutron absorber (having a neutron absorption cross section for thermal neutrons of around 755 barns) and has the advantage of being lightweight. Neutron shielding material can be produced containing $B_4C$ suspended in a metal matrix. One commonly selected matrix metal is aluminum, since aluminum is lightweight, strong and relatively inexpensive. Currently, neutron shielding comprising $B_4C$ suspended in an aluminum matrix is produced by cold-pressing aluminum powder containing dispersed ultrafine $B_4C$ particles into a green body having a desired shape and then sintering the green body at a temperature below the melting point of aluminum (about 660° C.). However, this process is relatively expensive and time consuming.

Another technique for producing neutron shielding material from $B_4C$ and aluminum is to mix particulate $B_4C$ into molten aluminum and cast the resulting melt into bodies having the desired shape. While relatively quick and cheap, this process suffers from the problem that molten aluminum is highly caustic and will readily dissolve $B_4C$, requiring that the $B_4C$ particles added to the melt be sufficiently large to survive total dissolution.

One method of reliably producing larger $B_4C$ particles would be to agglomerate finer $B_4C$ particles into larger ones. Currently, there is no known method of agglomerating pre-existing $B_4C$ particles. $B_4C$ has a low oxidation temperature of 400–500° C., which makes it difficult to thermally process in non-reducing atmospheres.

Prior attempts at agglomerating $B_4C$ have typically resulted in the transformation of the starting $B_4C$ powder into a puddle of $B_2O_3$ glass. There are currently no known techniques for cheaply, quickly and reliably agglomerating $B_4C$ into particles having controllable particle size distributions peaking in the 5–20 micron range or larger. There is therefore a need for a technique for rapidly and inexpensively producing $B_4C$ agglomerates. The present invention addresses this need.

SUMMARY OF THE INVENTION

One form of the present invention relates to a process for producing relatively coarse, agglomerated ceramic particles from relatively fine powder precursors. Another form of the present invention relates to a method for the agglomeration of submicron boron carbide particles, resulting in boron carbide agglomerates in the 5–20 micron size range or larger.

One object of the present invention is to provide an improved method for producing agglomerating ceramic particles. Related objects and advantages will become apparent from the following description.

DETAILED DESCRIPTION OF THE PREFERRED EMBODIMENT

Figure 1:
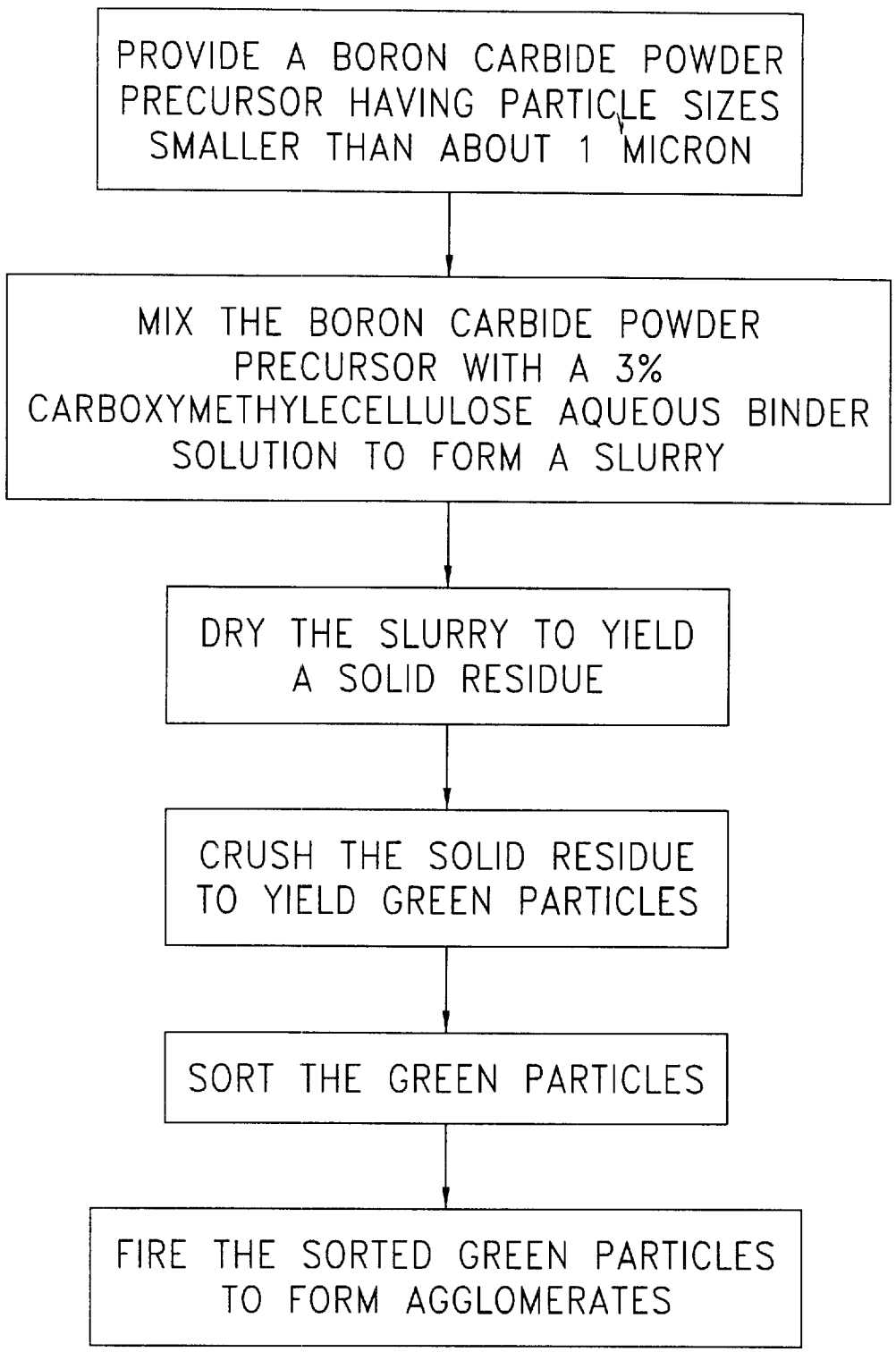
FIG. 1 is a flow chart schematically representing the processing steps of the present invention.
Figure 2A:
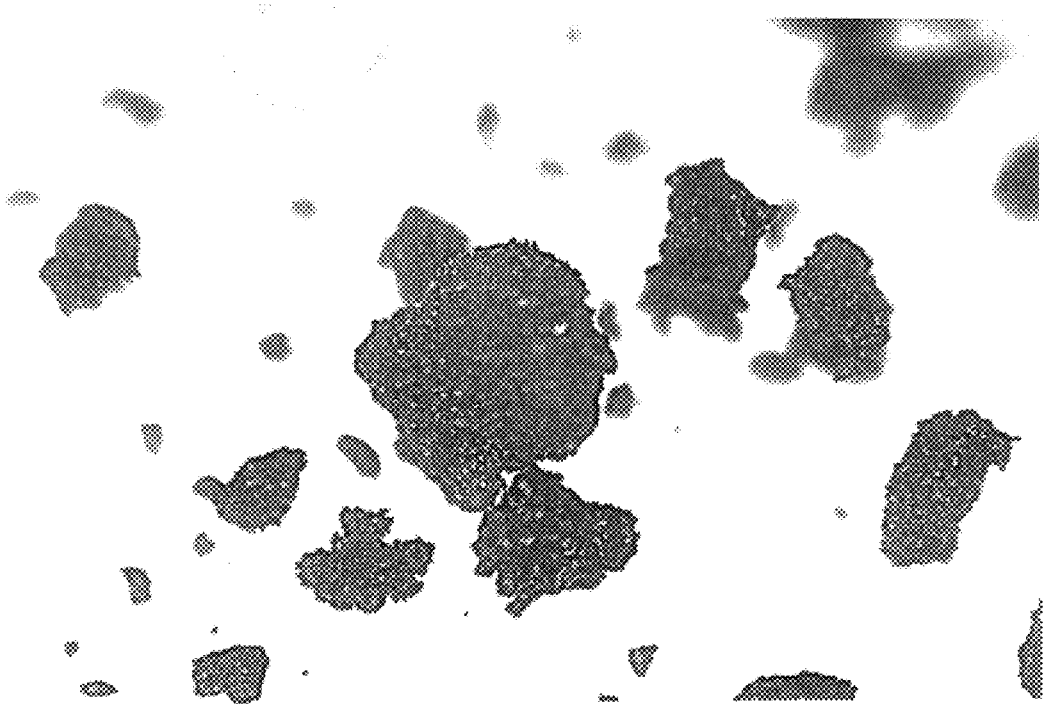
FIG. 2a is a first enlarged perspective view of agglomerated boron carbide.
Figure 2B:
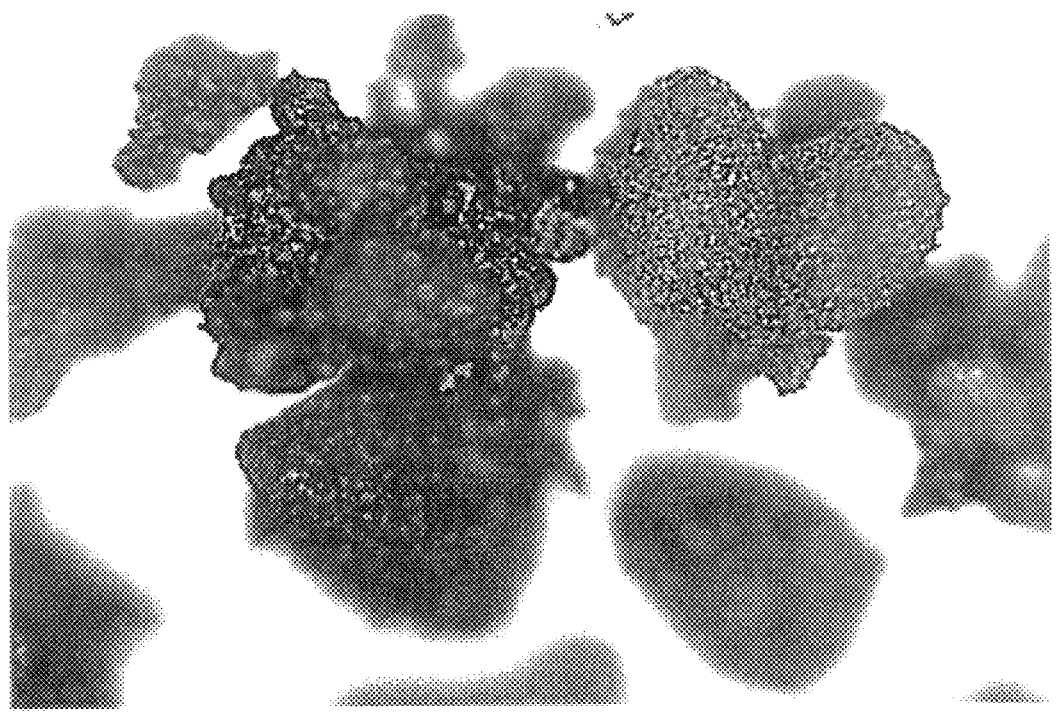
FIG. 2b is a second enlarged perspective view of agglomerated boron carbide.
Figure 2C:
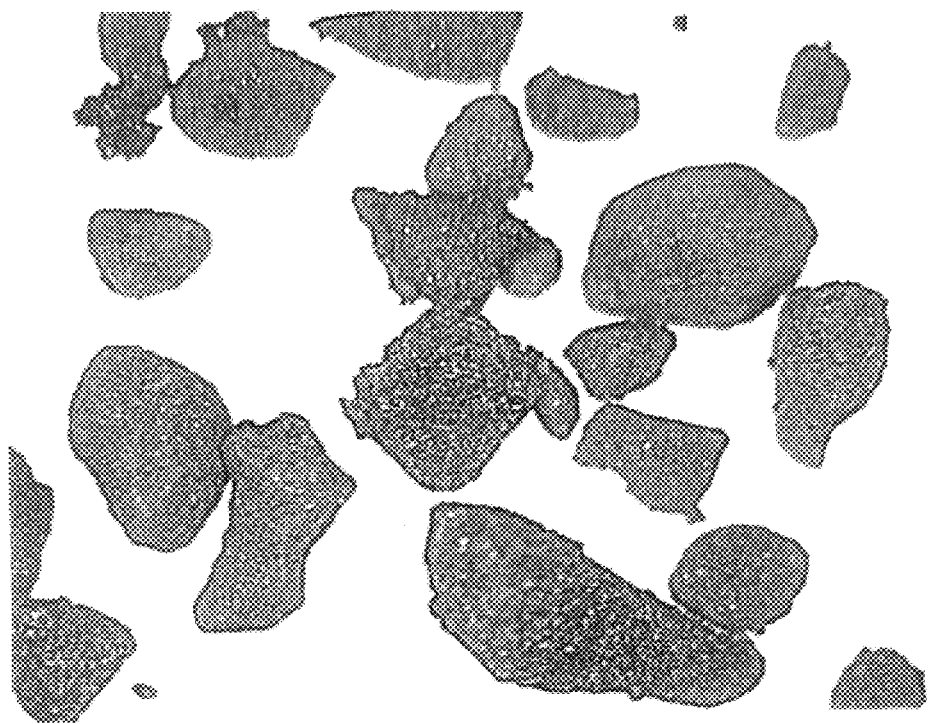
FIG. 2c is a third enlarged perspective view of agglomerated boron carbide.
Figure 2D:
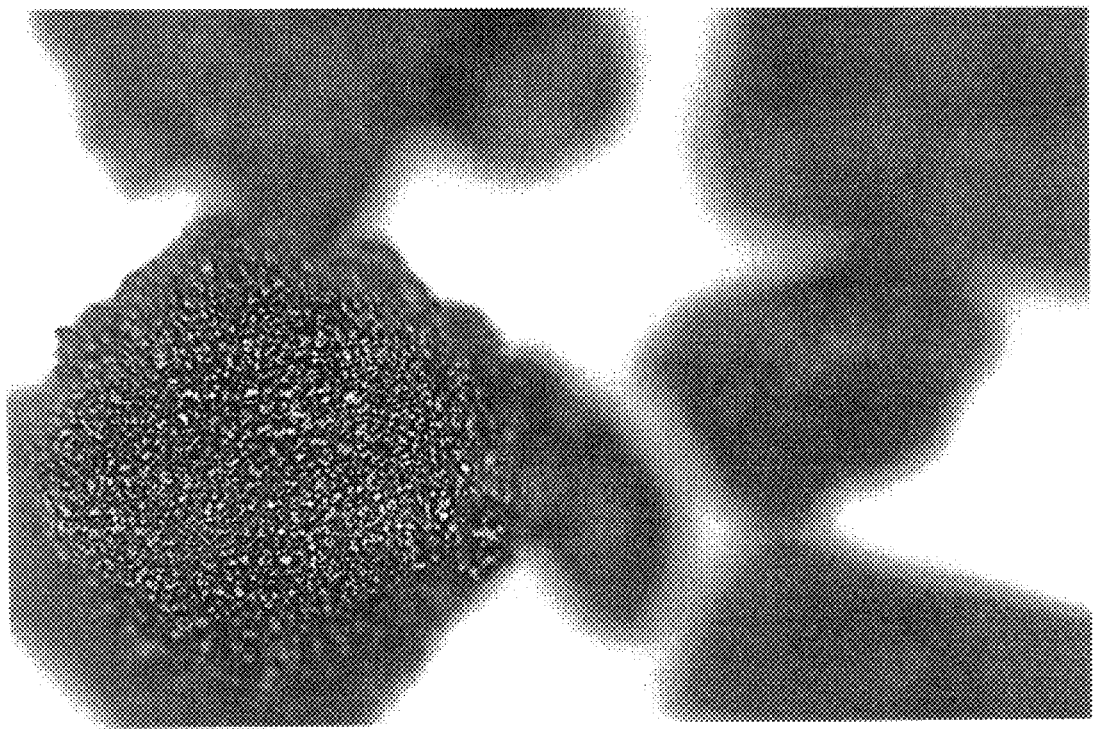
FIG. 2d is a fourth enlarged perspective view of agglomerated boron carbide.
Figure 2E:
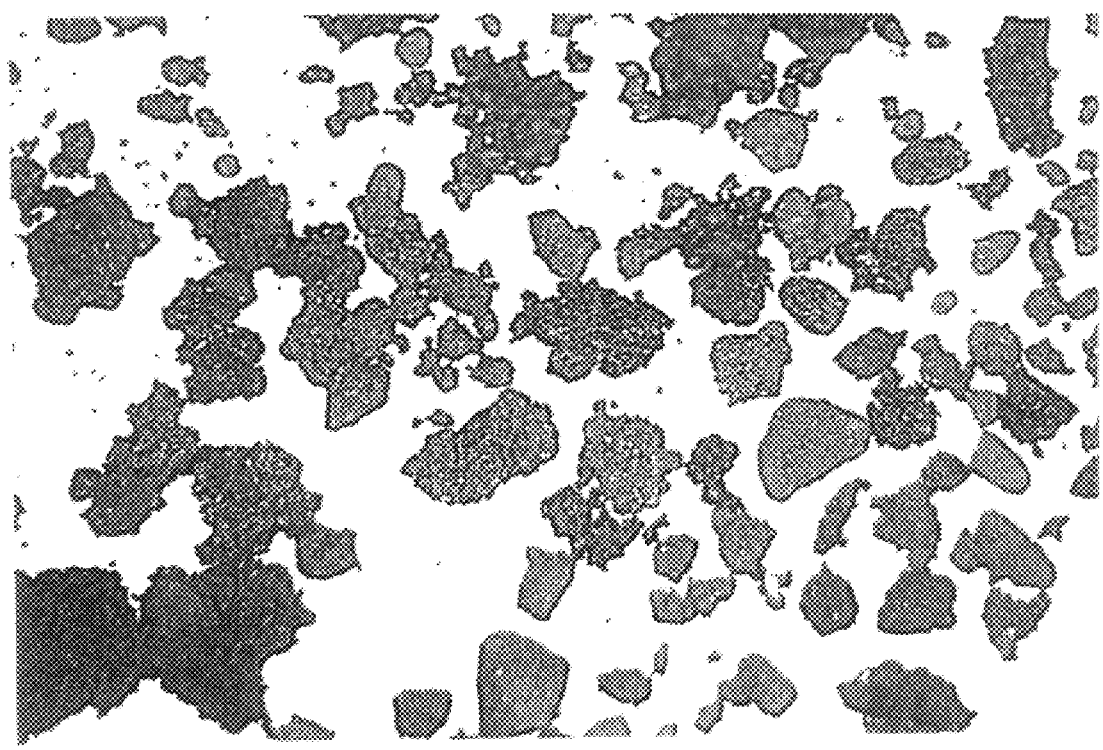
FIG. 2e is a fifth enlarged perspective view of agglomerated boron carbide.
Figure 3:
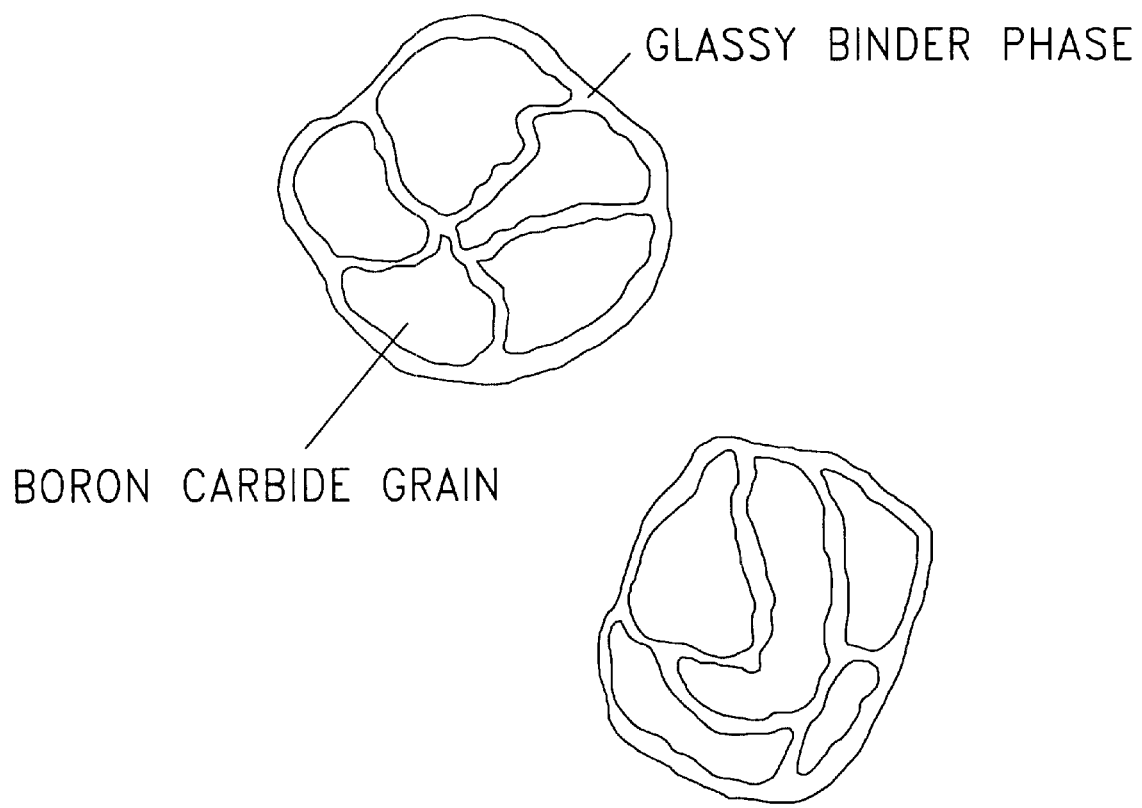
FIG. 3 is an enlarged schematic view of an agglomerated boron carbide particle.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

THE PRODUCTION OF BORON CARBIDE $B_4C$ is most commonly produced in electric arc furnaces by heating a mixture of anhydrous boric acid ($B_2O_3$) or other boron sources and carbon (usually in the form of graphite particles). The electric arc supplies enough thermal energy to melt the boric oxide and to react it with the graphite to produce boron carbide.

Boron oxide changes phase throughout the heating process. It softens at about 327° C., melts at about 452° C., yields a suboxide, $B_2O_2$, at about 1227° C. and boils at about 1860° C. The volatile $B_2O_2$ (g) provides a gas-solid mechanism through which boron carbide can be synthesized:

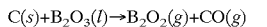

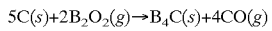

When in contact with carbon, boron oxide can react in the gas or liquid stage by nucleation and subsequent growth. The formation of boron carbide is highly dependent upon the phase change of boron oxide from solid to liquid to gaseous $B_2O_2$, and the effect of heating rate and the ultimate temperature on the rate at which the phase changes occur.

At low temperatures or heating rates, little nucleation occurs. Reaction proceeds through the phase transition of liquid boron oxide with growth process dominating. For intermediate to high heating rates ($10^3$ to $10^5$ k/s) from intermediate temperatures to the boiling point of boron oxide, reaction of carbon may occur with both $B_2O_3$(l) and $B_2O_2$(g). The liquid phase reaction dominates at low temperatures while the gas phase reactions dominates at higher temperatures. High rapid heating rates to high ultimate temperatures above the boiling point of boron oxide allow the boron oxide phase change to occur faster than any nucleation-growth reaction mechanism. Formation of boron carbide is believed to occur entirely via the reaction of $B_2O_2$(g). The resulting $B_4C$ product is extremely fine with particles growing by coagulation and coalescence.

The gas phase synthesis of ultrafine $B_4C$ can be obtained by suspending precursor particles of carbon and boron oxide in an argon stream and fed into a long graphite flow reactor which is maintained at temperatures between 1800° C. and 2300° C. As particles enter the reactor they are heated to temperatures above the boiling point of boron oxide:

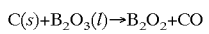

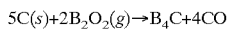

The rapid heating rate ($10^5$ k/s) promotes rapid volatilization of $B_2O_3$ and release of CO from the precursor particles forcing particle rupture. Particle rupture supports rapid reaction between boron and carbon leading to $B_4C$ clusters that grow to macroscopic particles by coagulation. Rapid cooling in the cooling zone at the end of the reactor stops particle coalescence.

The boron carbide particles obtained from this process have surface areas ranging from 12–32 $m^2/g$. Higher reactor temperatures led to powders with lower surface areas due it increased crystal growth and agglomeration at higher temperatures.

In laser-driven synthesis, a stream of reactant gases is introduced into a vacuum chamber a focused laser beam intersects the reactant jet and induces a rapid increase in temperature in the gas stream. The result is the nucleation and growth of particles via the reaction:

The products exiting the laser beam are rapidly cooled, thus limiting the size of the $B_4C$ particles so produced. Powders produced via laser reactions tend to be of high purity, controlled stoichiometry, uniform particle size and high surface area. The homogenous nucleation of particles in the laser beam results in powders that are equiaxed and fine. The highly pure $B_4C$ powder so produced exhibits a narrow particle size distribution centered at about 35 nm.

BORON CARBIDE IN THE NUCLEAR INDUSTRY

Boron carbide is widely used as a reactor control rod and neutron shielding material due to its high thermal neutron cross section. It may be used alone, as a powder ($\rho \cong 1.2$ g\cm$^3$) compacted into stainless steel tubes by vibration, or hot-pressed (sintered, $\rho=2.5$ g\cm$^3$) into pellets and clad in stainless steel tubes. Groups of these tubes may be fastened together to form rod clusters. It may also be utilized in reactor control rods as a cermet, that is, dispersed in stainless steel or aluminum. One common configuration is an alloy of boron carbide in aluminum (up to 50% by weight) and clad in aluminum.

Absorption of thermal neutrons by boron observes the following reactions:

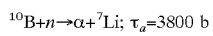
$^{10}B+n \rightarrow \alpha + ^7Li; \tau_a=3800$ b

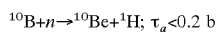
$^{10}B+n \rightarrow ^{10}Be+^1H; \tau_a<0.2$ b

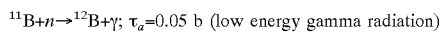
$^{11}B+n \rightarrow ^{12}B+\gamma; \tau_a=0.05$ b (low energy gamma radiation)

A problem associated with boron carbide in reactor environments is swelling and cracking in the control rods induced by the helium produced by the $^{10}B$ (n,$\alpha$) reaction.

THE PRODUCTION OF AGGLOMERATED BORON CARBIDE

The present invention relates to a method for producing ceramic powder agglomerates from fine or ultrafine powder precursors. More particularly, the present invention relates to a technique for the agglomeration of boron carbide powders, as shown schematically in FIG. 1. In general, the first step in the agglomeration of relatively fine ceramic particles is to suspend them in an aqueous solution of an organic binder, such as carboxymethylcellulose (CMC), preferably having a concentration of about 3%. The solution is then dried to yield a solid residue, and the dried solid residue is then crushed to yield green particles. The crushing process may be controlled to determine the size of the resultant green particles, which in turn controls the size of the final agglomerated particles. Moreover, the choice of binder, the concentration of binder in solution, the crushing parameters, and a subsequent sieving process may influence the shape of the green particles.

The crushed solid residue is then fired to a temperature sufficient to cause the binder to oxidize and the fine particles to adhere to one another and agglomerate. The firing temperature preferably ramped up slowly (about 1° C./minute or less) until the binder is volatilized and removed. The setpoint firing temperature required for particle agglomeration is a function of the furnace firing ramp and of the ceramic composition.

For example, a fine ceramic powder having a PSD with a peak particle size of about 1 micron is combined with sufficient 3% CMC aqueous solution to form a slurry. The slurry is mixed and then dried to yield a solid residue. The solid residue is crushed. The crushed residue is fired in air to a temperature sufficient to remove the binder and agglomerate the ceramic particles. The agglomerated particles may then be cooled and sieved.

Boron carbide powder particles of about 1–2 microns or less may be agglomerated into larger particles of about 5–20 microns or more by first mixing the fine precursor $B_4C$ particles with a 3% CMC aqueous solution to make a slurry. The slurry is mixed and then dried. Upon drying a solid residue is formed. The dried solid residue is then crushed to yield green particles of the desired size, in this example about 5–20 microns. The green particles are then fired in air to about cone 022 (roughly 480° C.) to produce agglomerated $B_4C$ particles in the desired 5–20 micron size range. By varying the crushing conditions, larger or smaller agglomerated particles may be produced.

In the case of agglomerating $B_4C$ particles, the firing process partially oxidizes the $B_4C$ to produce an amorphous $B_2O_3$ or quasi-$B_2O_3$ glassy binder phase and $CO_2$ gas. Since the $CO_2$ is evolved and outgassed into the furnace, a rapid ramp up to the agglomerating temperature could result in rapid or even explosive evolution of $CO_2$, and the consequent break-up of larger agglomerated particles. The amount and distribution of the glassy binder phase produced is a function of firing rate, firing temperature, and firing atmosphere. By controlling these parameters, the amount and distribution of glassy binder phase may be controlled. For instance, if agglomerated $B_4C$ particles having a $B_2O_3$ shell is desirable, the soak time at the agglomeration temperature could be increased and/or the maximum firing temperature could be elevated. Firing to cone 5, for instance, results in the generation of more glassy binder phase in the agglomerated particles, and an increase in particle strength, at the expense of some of the $B_4C$ phase. Conversely, if a minimal amount of binding glassy phase is required, the firing atmosphere could be made less oxidizing, the soak time could be decreased, and/or the maximum firing temperature could be reduced.

One alternative to the firing step is passing the green particles through a heat source, such as a flame or laser. If the green particles are rapidly passed through a sufficiently intense hot zone, rapid agglomeration may be induced. Moreover, if the green particles are passed through the hot zone under weightless or quasi-weightless conditions (such as aspiration), surface tension effects from the molten binder phase will cause the agglomerated particles to take on a substantially spherical shape.

Preferentially, CMC in a 3% aqueous solution is used as the binder. In other contemplated embodiments, other convenient organic binders may be used. Likewise, while the preferred concentration of CMC is 3% in aqueous solution, any convenient concentration of CMC capable of producing a crushable solid residue may be chosen.

Preferentially, highly pure boron carbide precursors are chosen, but the purity level of the precursors has a negligible effect on the agglomeration process and is chosen merely as a convenience to the desired end product. If the purity of the agglomerated particles is not a consideration, any convenient precursor of any desired purity level may be selected.

In the preferred embodiment, the boron carbide precursors were chosen from powders having a particle size of about 1 micron or less, but precursor particles of any convenient size may be selected. The agglomeration process is precursor particle size independent, with the size of the precursor particles merely influencing slurry mixing conditions, solid residue crushing conditions and furnace soak times.

PROPERTIES OF AGGLOMERATED BORON CARBIDE

FIGS. 2a–2e and FIG. 3 illustrate typical particles of agglomerated boron carbide. The agglomerated $B_4C$ particles range in size from about 5 to 20 microns and are comprised of individual $B_4C$ grains having mean particle sizes of about 0.5 to 1.0 microns. The individual $B_4C$ particles are held together by a glassy phase consisting primarily of $B_2O_3$. The agglomerated $B_4C$ particles are tightly bound by the amorphous $B_2O_3$ phase, since the relatively thin layer of glass has a high strength approximating that of pristine, defect free glass. If the $B_2O_3$ substantially coats the agglomerated particle, the $B_4C$ phase will enjoy the beneficial properties of a $B_2O_3$ surface. For example, the $B_4C$ phase will be shielded from an oxidizing atmosphere and the agglomerated particle will be more resistant to oxidation than a $B_4C$ crystallite of substantially the same size and shape.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are to be desired to be protected.

What is claimed is:

1. A method for producing agglomerated ceramic carbide particles, comprising the steps of:
    a) providing a ceramic carbide powder precursor having particle sizes smaller than about 1 micron in diameter;
    b) mixing the ceramic carbide powder precursor with binder solution to form a slurry;
    c) drying the slurry to yield a solid residue;
    d) crushing the solid residue to yield green particles; and
    e) firing the green particles to yield substantially spherical agglomerated carbide particles;
        wherein the green particles are fired in a quasi-weightless state;
        wherein spheroidization of the particles occurs during firing; and
        wherein in step e) the green particles are aspirated through a heat source.

2. The method of claim 1 wherein the binder is a 3% carboxymethylcellulose aqueous solution.

3. The method of claim 1 wherein the green particles are fired in air to about cone 022.

4. The method of claim 1 wherein the agglomerated green particles have diameters generally ranging from about 5 to about 20 microns.

5. The method of claim 1 wherein step e) comprises firing the green particles in air to about cone 022.

6. The method of claim 1 wherein step e) produces agglomerated particles comprising grains of about 1–2 microns in diameter in a vitreous matrix.

7. The method of claim 1 wherein during step c) the slurry temperature is ramped at about 1° C. per minute until the binder is volatilized.

8. The method of claim 1 wherein during step c) the slurry temperature is ramped at less than 1° C. per minute until the binder is volatilized.

9. A method for producing agglomerated boron carbide, comprising the steps of:
    a) providing a boron carbide powder precursor having particle sizes smaller than about 1 micron in diameter;
    b) mixing the boron carbide powder precursor with binder solution to form a slurry;
    c) drying the slurry to yield a solid residue;
    d) crushing the solid residue to yield green boron carbide particles; and
    e) firing the green boron carbide particles to produce agglomerated boron carbide particles;
        wherein the agglomerated boron carbide particles are characterized by crystalline boron carbide grains suspended in an amorphous boron oxide matrix.

10. The method of claim 9 wherein the binder is a 3% carboxymethylcellulose aqueous solution.

11. The method of claim 9 wherein the green boron carbide particles are fired in air to about cone 022.

12. The method of claim 9 wherein the agglomerated boron carbide particles have diameters generally ranging from about 5 to about 20 microns.

13. The method of claim 9 wherein step e) comprises firing the green boron carbide particles in air to about cone 022.

14. The method of claim 9 wherein step e) produces agglomerated $B_4C$ particles comprising $B_4C$ grains of about 1–2 microns in diameter in a vitreous $B_2O_3$ matrix.

15. The method of claim 9 wherein during step c) the slurry temperature is ramped at about 1° C. per minute until the binder is volatilized.

16. The method of claim 9 wherein during step c) the slurry temperature is ramped at less than 1° C. per minute until the binder is volatilized.

17. The method of claim 9 wherein during step e), the green boron carbide particles are fired in a quasi-weightless condition.

18. The method of claim 17 wherein during step e), the green boron carbide particles are fired by rapid passage through a flame.

19. The method of claim 9 wherein surface tension urges the particles into a substantially spherical shape during the firing step.

* * * * *